L. H. FLOYD & G. H. BALL.
HOOF SPREADER.
APPLICATION FILED JULY 6, 1911.
1,094,322.
Patented Apr. 21, 1914.
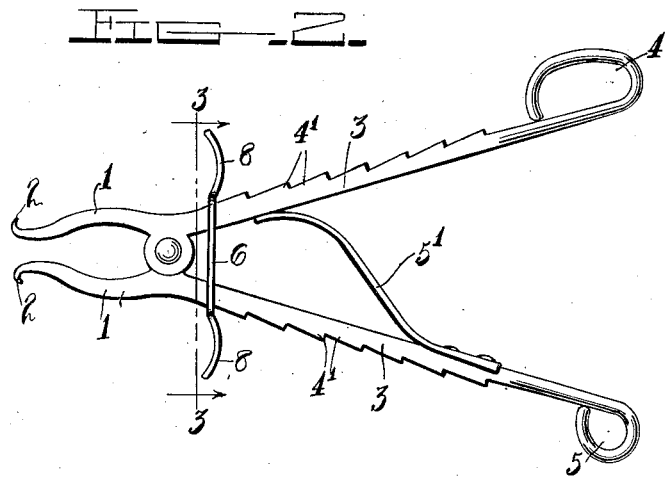
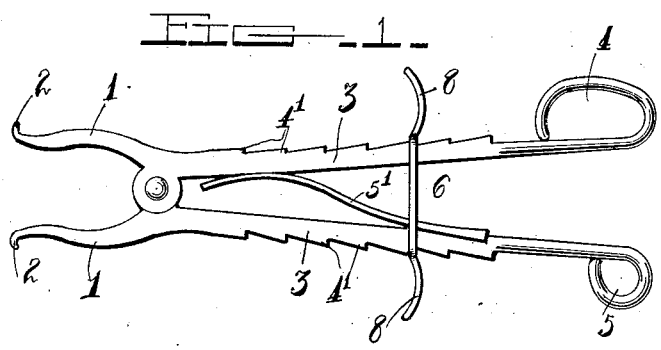
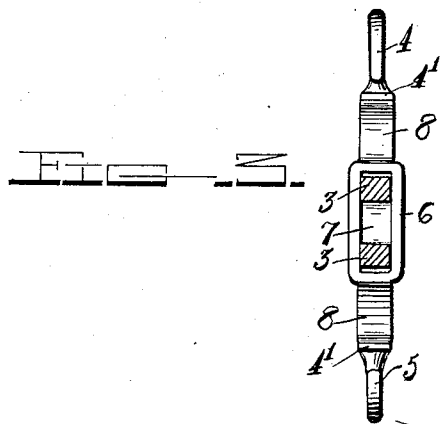
Inventors
L. H. Floyd
and G. H. Ball

UNITED STATES PATENT OFFICE.

LEROY H. FLOYD, OF LEWISTON, NEBRASKA, AND GEORGE HENRY BALL, OF LA FAYETTE, GEORGIA.

HOOF-SPREADER.

1,094,322.   Specification of Letters Patent.   Patented Apr. 21, 1914.

Application filed July 6, 1911. Serial No. 637,187.

*To all whom it may concern:*

Be it known that we, LEROY H. FLOYD and GEORGE H. BALL, citizens of the United States, residing, respectively, at Lewiston, in the county of Pawnee and State of Nebraska, and at La Fayette, in the county of Walker and State of Georgia, have invented certain new and useful Improvements in Hoof-Spreaders; and we do hereby declare that the following is a full, clear, and exact description of the invention, such as will enable others skilled in the art to which it appertains to make and use the same.

This invention relates to hoof spreaders, and has for its object to produce a tool of this character which is simple in construction, durable and efficient in operation, and one in which the jaws may be held in an adjusted position to properly spread the hoof when it is desired to apply the shoe thereto.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction, within the scope of the claim, may be resorted to without departing from the spirit or sacrificing any of the advantages of the invention.

In the drawing:—Figure 1 is a side elevation of the tool, the jaws being spread apart. Fig. 2 is a similar view, showing the jaws in their position before being spread. Fig. 3 is a sectional view on line 3—3 of Fig. 2.

Referring to the drawings, the numeral 1 designates a pair of jaws, said jaws being pivotally connected and curved toward each other, and having their extreme outer ends 2 turned outwardly and around. The jaws terminate in levers 3 which have their extreme outer ends provided with finger and thumb loops 4 and 5. The outer face of each lever 3 is provided with ratchets 4'.

Secured at its outer end to one of the levers 3 is a leaf spring 5', said spring having its inner end resting against the opposite lever and being formed to slide thereon when the jaws and levers are forced toward or away from each other. Slidably mounted upon the levers 3 is a bar 6, said bar being provided with an elongated slot 7, through which the levers pass. Formed integral with the opposite ends of the bar 6 are outwardly curved finger engaging portions 8, by which the bar is moved along to its proper adjustment upon the levers 3 to hold the jaws in an adjusted spread position.

In using the device the operator places the rounded ends of the jaws 1 in their proper position upon the hoof, and upon forcing the levers toward each other the hoof is spread the required distance, and the bar 6 is moved along the levers until it engages in the proper ratchets, whereby the hoof is held in its proper spread condition, the spring acting to normally force the levers apart when the tool is released.

It will be observed that by reason of the provision of the finger grips 8 the operator may use the device with one hand while the other is being used to hold the hoof. To do this the operator places his thumb in the loop 5, the third and fourth fingers are engaged in the loop 4 and the first and second fingers are hooked over the grips 8; he can thus pull the handles together and at the same time drop the bar 6 into the proper position.

What is claimed, is:—

In a hoof spreader, in combination, a pair of arms pivoted together adjacent one end forming jaw portions and handle portions, the ends of the jaw portions extended and curved outwardly and inwardly to form hoof engaging terminals, the handle portions formed on their outer surfaces with a plurality of equally spaced ratchet teeth, a link surrounding the handle members and having its end portions engaging the ratchet teeth, curved extensions from said end portions forming finger pieces, finger engaging means at the end of each handle portion and a spring positioned between the handle portions and tending to force them apart, said spring being located between the sides of said loop when the loop is engaged on the ratchet teeth whereby lateral displacement of said spring is prevented.

In testimony whereof, I affix my signature, in presence of two witnesses.

LEROY H. FLOYD.

Witnesses:
C. E. WHITE,
C. W. WILLIAMS.

In testimony whereof, I affix my signature, in presence of two witnesses.

GEORGE HENRY BALL.

Witnesses:
F. H. KIRBY,
J. W. MASSEY.

Copies of this patent may be obtained for five cents each, by addressing the "Commissioner of Patents, Washington, D. C."